(12) United States Patent
Fei

(10) Patent No.: US 11,846,385 B2
(45) Date of Patent: Dec. 19, 2023

(54) MULTIFUNCTIONAL APPARATUS TO SUPPORT AND LIFT A COMPUTING DEVICE

(71) Applicant: Shanghai Linghai Commerce Center, Shanghai (CN)

(72) Inventor: Tang Yong Fei, Shanghai (CN)

(73) Assignee: Shanghai Linghai Commerce Center, Shanghai (CN)

( * ) Notice: Subject to any disclaimer, the term of this patent is extended or adjusted under 35 U.S.C. 154(b) by 0 days.

(21) Appl. No.: 17/373,709

(22) Filed: Jul. 12, 2021

(65) Prior Publication Data

US 2023/0010833 A1    Jan. 12, 2023

(51) Int. Cl.
*F16M 11/04* (2006.01)
*F16M 11/20* (2006.01)

(52) U.S. Cl.
CPC ....... *F16M 11/2064* (2013.01); *F16M 11/041* (2013.01)

(58) Field of Classification Search
CPC .... F16M 11/041; F16M 11/14; F16M 11/126; F16M 11/2014; F16M 11/2021; F16M 11/2064; F16M 11/2078; F16M 2200/066; F16M 2200/021; F16M 2200/024; F16M 2200/044; F16M 2200/045; A47B 97/00; A47B 2097/006
See application file for complete search history.

(56) References Cited

U.S. PATENT DOCUMENTS

| | | | |
|---|---|---|---|
| 6,915,996 B2 * | 7/2005 | Lin | F16M 11/14 248/481 |
| 7,338,022 B2 * | 3/2008 | Hung | F16M 11/24 248/278.1 |
| 9,316,346 B2 * | 4/2016 | Lau | F16M 13/022 |
| 9,657,889 B1 * | 5/2017 | Chumakov | F16M 11/24 |
| 10,167,894 B2 * | 1/2019 | James | F16C 11/0614 |
| 10,309,578 B2 * | 6/2019 | Yen | F16M 11/041 |
| 10,480,709 B1 | 11/2019 | Chumakov | |
| 10,851,938 B2 * | 12/2020 | Glickstein | F16M 11/2014 |
| 11,118,729 B2 * | 9/2021 | Zebarjad | F16M 13/022 |
| 11,131,332 B2 * | 9/2021 | Huang | F16B 2/065 |
| 11,287,083 B2 * | 3/2022 | Lim | F16M 11/08 |
| D948,522 S * | 4/2022 | You | D14/452 |
| 11,543,072 B2 * | 1/2023 | Xiang | F16M 11/22 |
| 2011/0260017 A1 * | 10/2011 | Monsalve | F16M 13/022 248/201 |
| 2014/0367137 A1 * | 12/2014 | Leung | F16M 11/2014 174/68.3 |
| 2023/0010833 A1 * | 1/2023 | Fei | F16M 11/041 |

* cited by examiner

*Primary Examiner* — Jonathan Liu
*Assistant Examiner* — Guang H Guan
(74) *Attorney, Agent, or Firm* — Hawkinson Yang LLP

(57) ABSTRACT

A multifunctional apparatus to lift and support a computing device includes a base assembly, an oblique arm assembly, a power arm assembly, a head assembly, and a board assembly. The base assembly is adaptable to secure with a platform. The oblique arm assembly is pivotally connected with the base assembly. The power arm assembly is pivotally connected with the oblique arm assembly. The head assembly having a proximal end, and a distal end, wherein the proximal end is pivotally connected with the power arm assembly. The board assembly is rotatably connected with the distal end of the head assembly. The board assembly is adaptable to securely support the computing device.

11 Claims, 22 Drawing Sheets

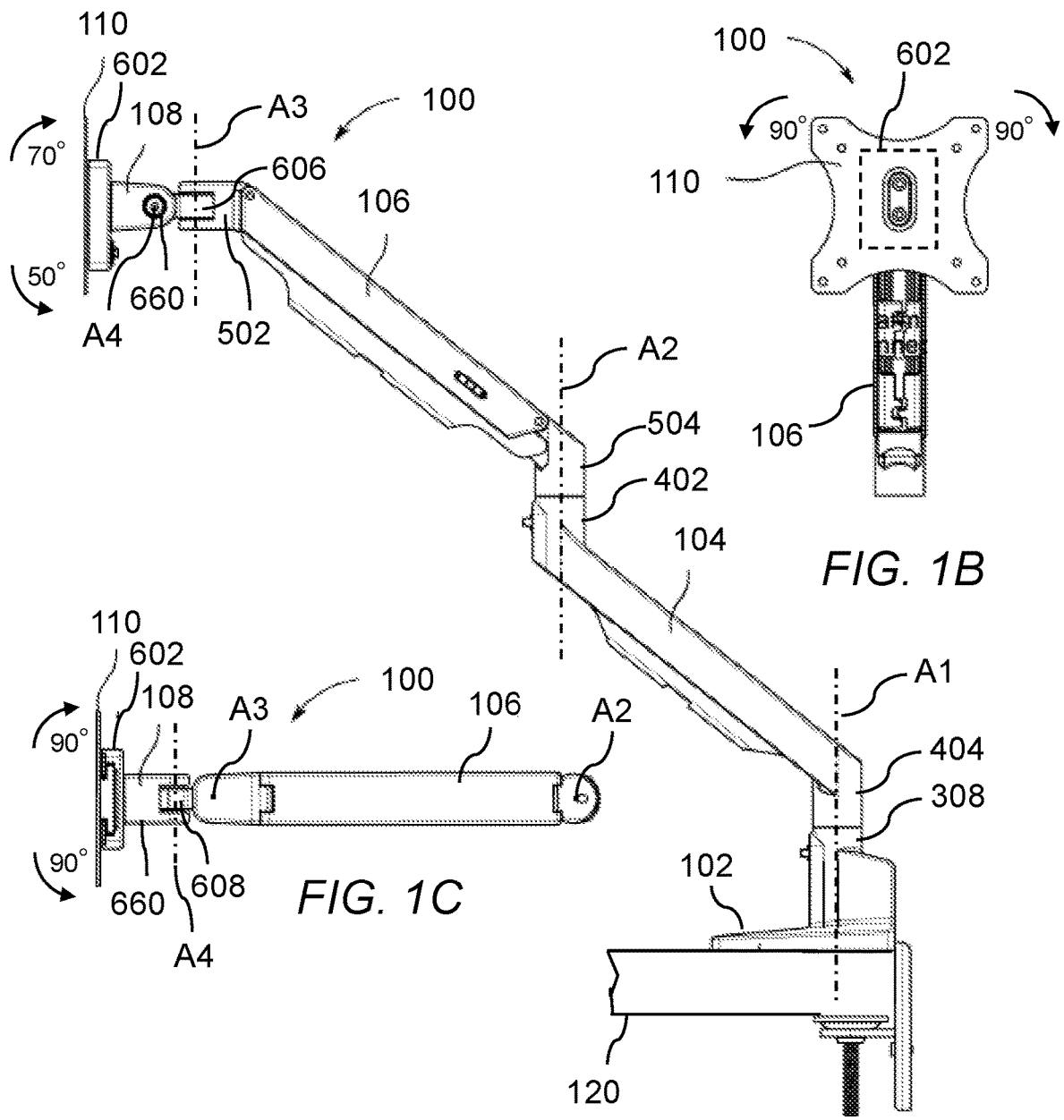

MULTIFUNCTIONAL APPARATUS TO SUPPORT AND LIFT A COMPUTING DEVICE

TECHNICAL FIELD

The present disclosure relates generally to a multifunctional apparatus, and in particular to a multifunctional apparatus configured to lift and support a computing device, and to enable movement and positioning of the computing device at multiple coupling points of the apparatus.

BACKGROUND

Typically, apparatuses or mechanisms to support display devices often include various arms that extend from a platform or supporting surfaces. Some of these apparatuses are configured to hold the display devices and utilize gas springs or coiled springs to support the display device at a particular location. For instance, U.S. Pat. No. 10,480,709 discloses an adjustable support arm utilizing an elastomeric member having a dynamic attachment point to support the weight of an attached object. The adjustable support arm can include a lower bracket that is connected to an upper bracket by an upper arm and a lower arm. The elastomeric member counterbalances the weight of an attached object. The first end of the elastomeric member can be attached to a linkage, which can include a first, second, and third link and the second end of the elastomeric member can be attached to one of the arms. The links can be coupled to each other between the upper and lower arms such that the linkage is dynamically moveable upon movement of the support arm. Support arms, like the one disclosed in U.S. Pat. No. 10,480,709 do not describe movement and positioning of devices at multiple coupling points of the support arm.

There is a need for an efficient and easy-to-use multifunctional apparatus to lift and support a computing device. There is a need for an apparatus that can permit a user to easily adjust the position of the computing devices without using any springs. Further, there is a need for an apparatus that can accommodate a user's particular preference in a way that is relatively easy for the user. Further, there is a need for an apparatus that can facilitate the user to adjust the positioning of the computing devices as per his/her requirements.

SUMMARY

An aspect of the disclosure relates to an apparatus for securing a computing device relative to a platform. The apparatus includes a base assembly, an oblique arm assembly, a power arm assembly, a head assembly, and a board assembly.

The base assembly is configured to secure to the platform, and has a base connector defining a first axis of the apparatus relative to the platform. The oblique arm assembly has a lower connector and an upper connector. The lower connector is coupled to the base connector along the first axis and is rotatable, together with the rest of the oblique arm, at least partially about the first axis. The base connector and lower connector include a switch mechanism that sets the range of rotation of the oblique arm assembly about the first axis.

The upper connector of the oblique arm assembly defines a second axis of the apparatus. The power arm assembly also has a lower connector and an upper connector. The lower connector of the power arm assembly is coupled to the upper connector of the oblique arm assembly along the second axis and is rotatable, together with the rest of the power arm assembly, at least partially about the second axis. The lower connector of the power arm assembly and the upper connector of the oblique arm assembly include a switch mechanism that sets the range of rotation of the power arm assembly about the second axis. The power arm assembly itself defines a fifth axis of the apparatus about which the power arm assembly rotes to move up and down relative to the platform.

The upper connector of the power arm assembly defines a third axis of the apparatus. The head assembly has a head and a coupling. The coupling of the head assembly is coupled to the upper connector of the power arm assembly along the third axis and can rotate, together with the rest of the head assembly, at least partially about the third axis.

The board assembly is coupled to the head of the head assembly and is configured to secure to the computing device.

It is understood that other aspects of apparatuses will become readily apparent to those skilled in the art from the following detailed description, wherein various aspects of apparatuses are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of apparatuses will now be presented in the detailed description by way of example, and not by way of limitation, with reference to the accompanying drawings, wherein:

FIG. 1A is a side view illustration of a multifunctional apparatus configured to lift, support, and enable movement and positioning of a computing device relative to a platform, in accordance with one embodiment, and including a base assembly, an oblique arm assembly, a power arm assembly, a head assembly, and a board assembly.

FIG. 1B is a front view illustration of the multifunctional apparatus of FIG. 1A, in accordance with one embodiment.

FIG. 1C is a top view illustration of the multifunctional apparatus of FIG. 1A, in accordance with one embodiment.

DETAILED DESCRIPTION

Figures 2A, 2B:
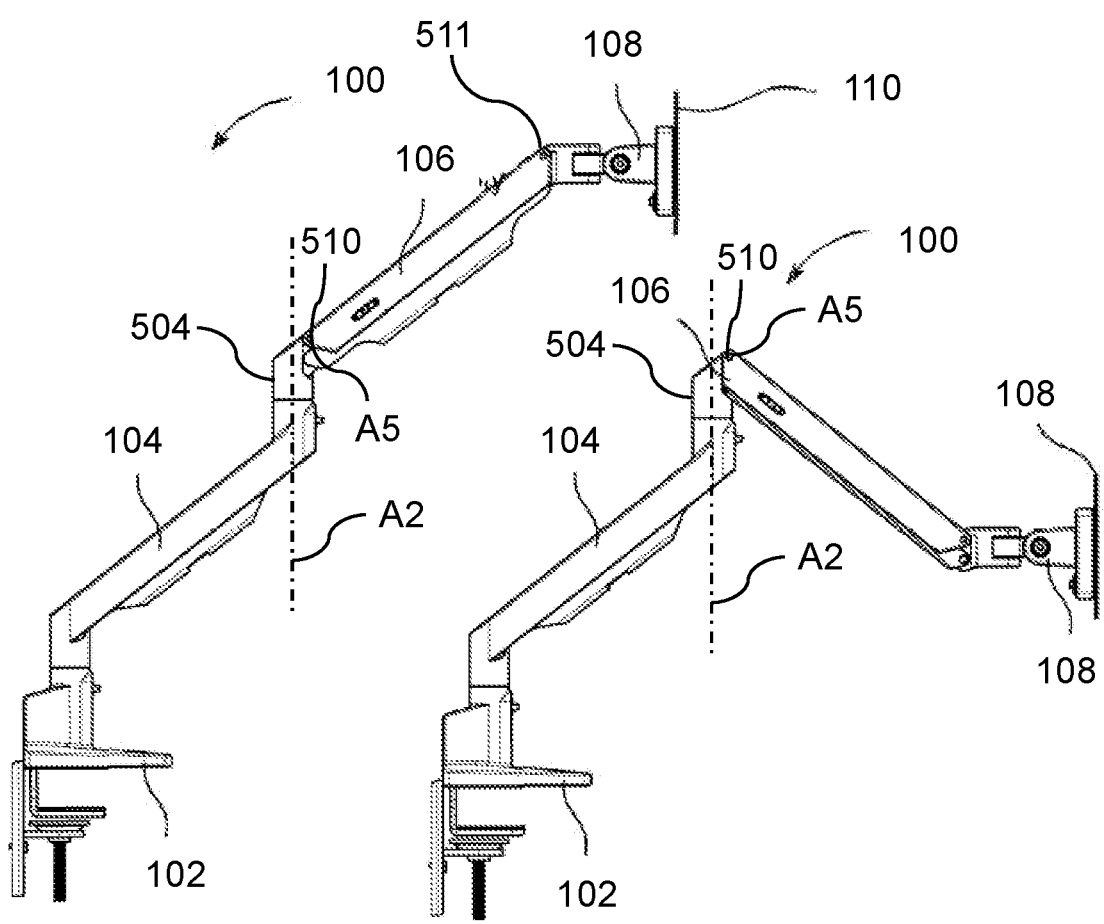
FIG. 2A is a side view illustration of the multifunctional apparatus of FIG. 1A with the power arm assembly arranged to locate the board assembly at a highest point, in accordance with one embodiment.
FIG. 2B is a side view illustration of the multifunctional apparatus of FIG. 1A with the power arm assembly arranged to locate the board assembly at a lowest point, in accordance with one embodiment.

With reference to FIGS. 1A-1C, disclosed herein is a multifunctional apparatus 100 for securing and positioning a computing device relative to platform. Examples of computing devices include but are not limited to a desktop computer, an LCD/LED display screen, a laptop computer, display devices, a monitor, a smartphone, a notebook, a workstation, a mainframe computer, and the like. In some embodiments, the apparatus may secure and support monitors of various sizes, in the range of 13 to 32 inches, and weights up to 40 lbs. Example of platforms include tabletops, desks tops, and the like.

The disclosed multifunctional apparatus 100 permits a user to easily adjust the position of the computing devices at multiple points along the length of the apparatus and about multiple axes and in multiple locations. Further, the multifunctional apparatus 100 accommodates the user's particular preference in a way that is relatively easy for the user. Furthermore, the multifunctional apparatus 100 enables the user to adjust the positioning of the computing devices as per his/her requirements.

With reference to FIGS. 1A-1C, in some embodiments the multifunctional apparatus 100 for securing a computing device relative to a platform 120 has a number of interconnected assemblies including: a base assembly 102, an oblique arm assembly 104, a power arm assembly 106, a head assembly 108, and a board assembly 110. These assemblies include various parts that form mechanisms that enable multiple points of rotation between the base assembly 102 and the board assembly 110, and various ranges of rotation of the assembles. These various points and ranges of rotation provide for customized positioning, e.g., vertical location from user's point of view, lateral distance from user's point of view, angle from user's point of view, etc., of the computing device based on user preferences, and thus improve the ergonomics of the user's workstation and reduces the user's neck, shoulder, and back pain. The various assemblies may be made of iron or aluminium.

The base assembly 102 is configured to secure to the platform 120 and has a base connector 308 that defines a first axis A1 of the apparatus relative to the platform. The first axis A1 is generally orthogonal to the planar surface of the platform. "Generally orthogonal" refers to an angular relationship between an axis and a surface that is in the range of 90-degrees±15 degrees.

The oblique arm assembly 104 has a lower connector 404 and an upper connector 402. The oblique arm lower connector 404 is coupled to the base connector 308 along the first axis A1 and is configured to rotate at least partially about the first axis. The oblique arm upper connector 402 defines a second axis A2 of the apparatus that is generally parallel with the first axis A1. "Generally parallel" refers to a relationship between axes wherein one axis is parallel to the other or within a degree, e.g., ±15 degrees, of being parallel.

Regarding the coupling of the oblique arm assembly 104 and the base assembly 102 and the rotation of the oblique arm lower connector 404, in some embodiments this coupling enables the lower connector, together with the rest of the oblique arm assembly 104, to rotate a first number of degrees, e.g., 360-degrees, about the first axis A1. In other embodiments, the coupling of the oblique arm assembly 104 and the base assembly 102 enables the oblique arm lower connector 404, together with the rest of the oblique arm assembly 104, to rotate a second number of degrees, e.g., 180-degrees, about the first axis A1. As described further below, in some embodiments, components at the coupling of the oblique arm assembly 104 and the base assembly 102 form a switch mechanism configured to enable the oblique arm assembly 104 to be locked in place relative to the base assembly 102, to be rotatable 360-degrees relative to the base assembly 102, or to be rotatable 180-degrees relative to the base assembly 102.

With continued reference to FIGS. 1A-1C, the power arm assembly 106 has a lower connector 504 and an upper connector 502. The power arm lower connector 504 is coupled to the oblique arm upper connector 402 of the oblique arm assembly 104 along the second axis A2 and is configured to rotate at least partially about the second axis. The upper connector 502 of the power arm assembly 106 defines a third axis A3 of the apparatus that is generally parallel with the second axis A2.

Regarding the coupling of the power arm assembly 106 and the oblique arm and the rotation of the power arm lower connector 504, in some embodiments this coupling enables the lower connector, together with the rest of the power arm assembly 106, to rotate a first number of degrees, e.g., 360-degrees, about the second axis A2. In other embodiments, the coupling of the power arm assembly 106 and the oblique arm assembly 104 enables the power arm lower connector 504, together with the rest of the power arm assembly 106, to rotate a second number of degrees, e.g., 180-degrees about the second axis A2. As described further below, in some embodiments, components at the coupling of the power arm assembly 106 and the oblique arm assembly 104 form a switch mechanism configured to enable the power arm assembly 106 to be locked in place relative to the oblique arm assembly 104, to be rotatable 360-degrees relative to the oblique arm assembly 104, or to be rotatable 180-degrees relative to the oblique arm assembly 104.

With continued reference to FIGS. 1A-1C, the head assembly 108 has a head 602 and a coupling 606, and a pivot structure 660 between the head and the coupling. The coupling 606 is coupled to the upper connector 502 of the power arm assembly 106 along the third axis A3 and is configured to rotate at least partially about the third axis. The pivot structure 660 defines a fourth axis A4 of the apparatus that is generally orthogonal to the third axis A3.

The board assembly 110 is coupled to the head 602 of the head assembly 108 and is configured to be secured to the computing device.

With reference to FIGS. 2A and 2B, in some embodiments the power arm assembly 106 includes a pivot structure 510 near the power arm lower connector 504 and a spring assembly (not visible). The pivot structure 510 defines a fifth axis A5 of the apparatus. The pivot structure 510 together with the spring assembly enable the power arm assembly 106 to be rotated relative to the fifth axis A5 to transition between an upper position (shown in FIG. 2A) and a lower position (shown in FIG. 2B). The spring assembly, which is described in detail below with reference to FIGS. 5D-5F, enables the board assembly 110 to be positioned and fixed in place at any location between the upper position (shown in FIG. 2A) and the lower position (shown in FIG. 2B). In one example configuration, when in the upper position of FIG. 2A, the distance between the middle of the board assembly 110 and the top of the platform is about 485 millimeters. In one example configuration, when in the lower position of FIG. 2B, the distance between the middle of the board assembly 110 and the top of the platform is about 200 millimeters.

Figure 3A:
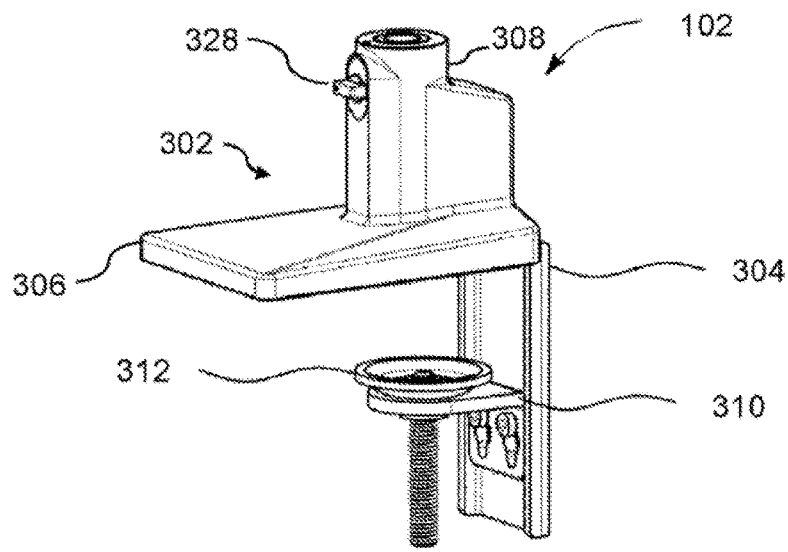
FIGS. 3A and 3B are perspective view illustrations of the base assembly of the multifunctional apparatus of FIG. 1A and various component parts thereof, in accordance with one embodiment.

With reference to FIG. 3A, in some embodiments the base assembly 102 of the apparatus of FIG. 1A includes an L-type clamp assembly 302 having a side 304 and a base 306 that are generally orthogonal to each other. A base connector 308 extends upward from the base 306 and is configured to couple with the oblique arm assembly 104. The base assembly 102 also includes an L-type clamp securing plate 310 that extends from the side 304 of the L-type clamp assembly 302, and an L-type clamp screw 312 that couples to the L-type clamp securing plate and is threaded therewith. The L-type clamp screw 312 is configured to move up and down relative to the underneath surface of the base 306.

Figure 3B:
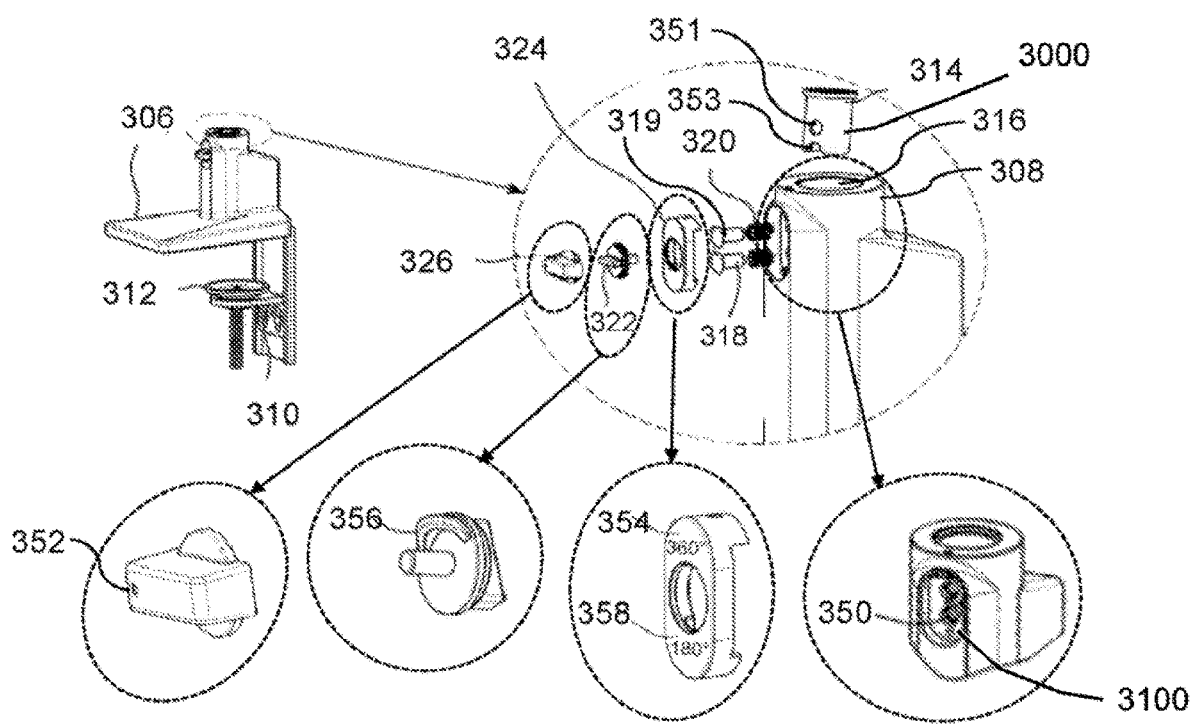

With additional reference to FIG. 3B, in some embodiments the base connector 308 includes a powder sleeve 314 located within a powder sleeve hole 316, a first pair of pins 318, 319 each with a corresponding small pressure spring 320. The powder sleeve 314 has a surface 3000 and defines a pair of features 351, 353. The base connector 308 also includes a first knob 322, a first pressure cap 324, a first knob cover 326, and a pair of holes 350 extending through a surface 3100 of the base connector 308 into the powder sleeve hole 316. With reference to FIG. 3A, these components collectively form a first switch mechanism 328 that enables the range of rotation of the oblique arm assembly 104 about the first axis A1 to be set to either a first number, e.g., 360-degrees, or a second number, e.g., 180-degrees. The first switch mechanism 328 also enables the oblique arm assembly 104 to be either locked in place to prevent separation or removal from the base assembly 102 or to be unlocked to allow separation or removal from the base assembly.

Figure 4A:
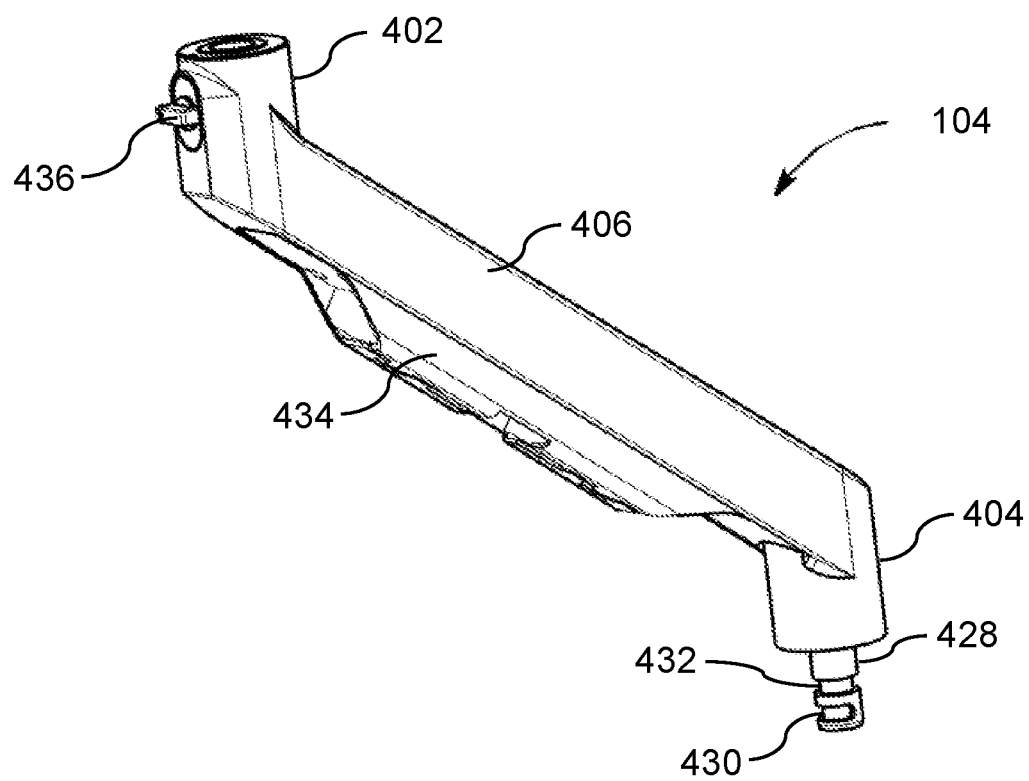
FIGS. 4A-4E are perspective view illustrations of the oblique arm assembly of the multifunctional apparatus of FIG. 1A and various component parts thereof, in accordance with one embodiment.

To these ends, in some embodiments, the components of the first switch mechanism 328 are arranged and aligned relative to each other so that when the first knob cover 326 is placed at a horizontal position (as shown in FIG. 3A), the biasing forces of the small pressure springs 320 maintain the first pair of pins 318, 319 in a retracted position relative to corresponding holes 350 associated with the base connector 308 and with corresponding features 351, 353 of the powder sleeve 314. In the retracted position, a fixed pin 428 (shown in FIG. 4A) of the oblique arm assembly 104 is unlocked from the base connector 308 and the oblique arm assembly may be vertically displaced (e.g., moved up or down) along the first axis A1 and decoupled from the base assembly 102.

When the first knob cover 326 is rotated to align an indicator 352 of the cover with a 360-degree mark 354 on the first pressure cap 324, a pin arc 356 of the first knob 322 engages the head or arc of the top pin 319 and advances the top pin through the top hole 350 of the base connector 308 and the top feature 351 of the powder sleeve 314. The shaft of the top pin 319 is thus placed into a 360-degree slot 432 (shown in FIG. 4A) of the fixed pin 428 of the oblique arm assembly 104. Accordingly, the oblique arm assembly 104 can rotate 360 degrees about the first axis A1. In this state of the first switch mechanism 328, the oblique arm assembly 104 cannot be removed from the base connector 308 because the end of the top pin 319 is within the 360-degree slot 432 and prevents vertical displacement (e.g., upward movement) of the oblique arm assembly 104 along the first axis A1.

When the first knob cover 326 is rotated to align the indicator 352 with a 180-degree mark 358 on the first pressure cap 324, the pin arc 356 of the first knob 322 engages the head or arc of the bottom pin 318 and advances the bottom pin through the bottom hole 350 of the base connector 308 and the bottom feature 353 of the powder sleeve 314. The shaft of the bottom pin 318 is thus placed into the 180-degree slot 430 (shown in FIG. 4A) of the fixed pin 428 of the oblique arm assembly 104. Accordingly, the oblique arm assembly 104 can rotate 180 degrees (±90 degrees) about the first axis A1. In this state of the first switch mechanism 328, the oblique arm assembly 104 cannot be removed from the base connector 308 because the end of the bottom pin 318 is within the 180-degree slot 430 and prevents vertical displacement (e.g., upward movement) of the oblique arm assembly 104 along the first axis A1.

With reference to FIGS. 4A-4E, in some embodiments the oblique arm assembly 104 of the apparatus of FIG. 1A includes an oblique arm upper connector 402, an oblique arm lower connector 404, and an oblique arm 406 extending between the connectors. A cable retainer 434 extends from the underneath side of the oblique arm 406 and is configured to receive electrical cables. The cable retainer 434 may be secured to the underside of the oblique arm 406 by interlaced snap slots and is removable.

Figure 4B:
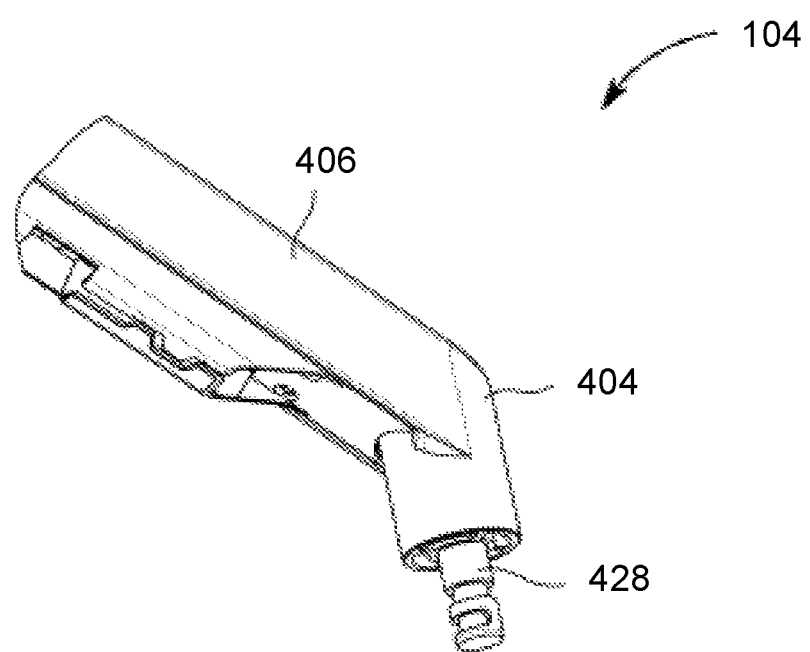
Figure 4C:
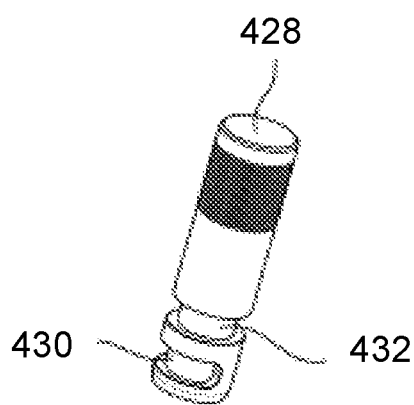
Figure 4D:
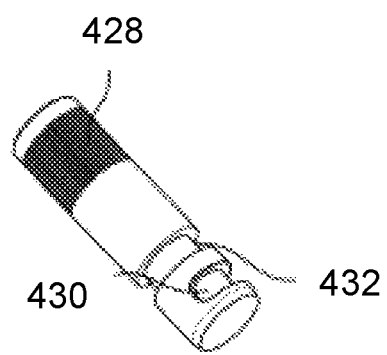
Figure 4E:
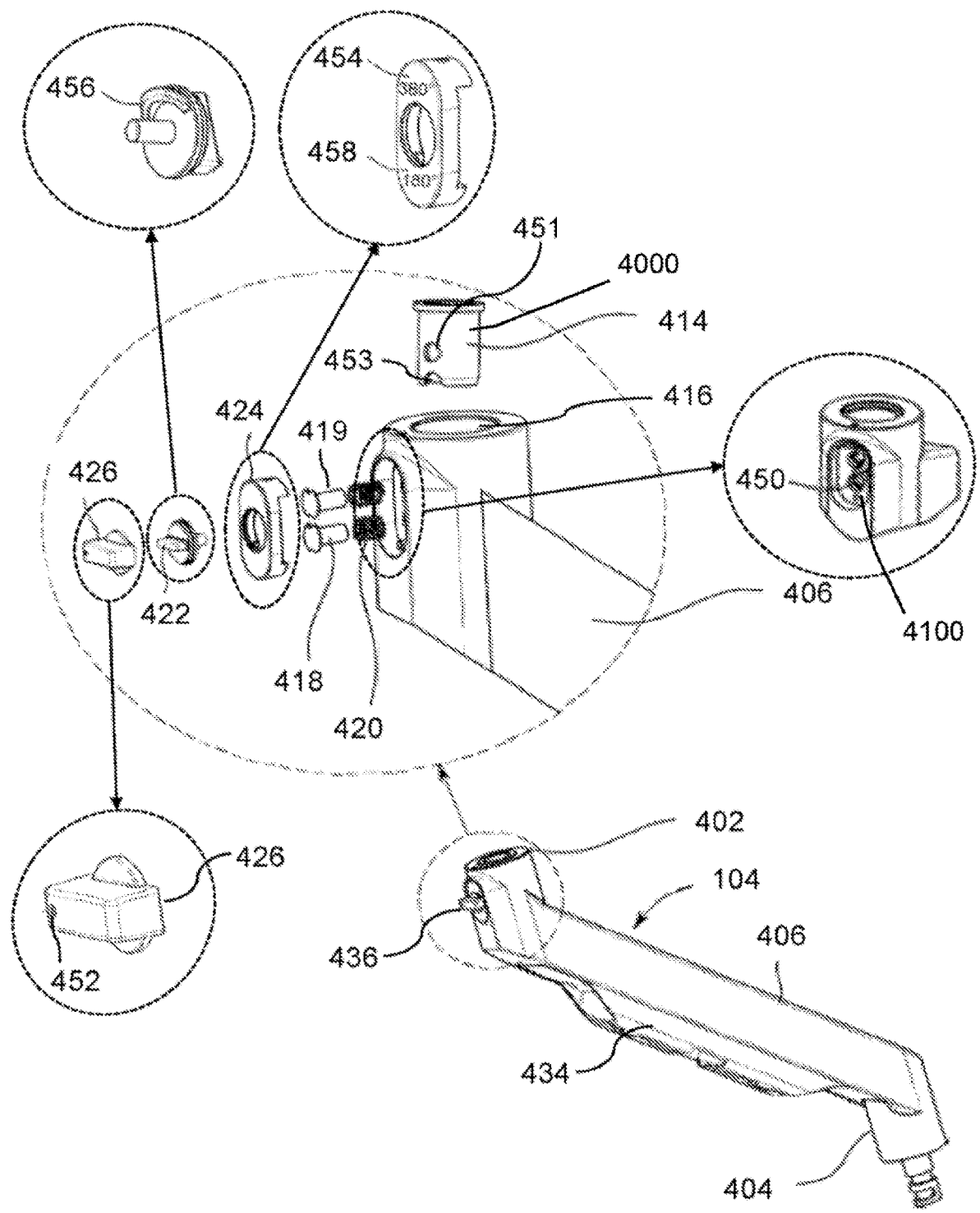

With reference to FIG. 4B, the oblique arm lower connector 404 includes a fixed pin 428. The fixed pin 428 is configured to fit within and couple with the powder sleeve 314 (shown in FIG. 3B) included in the base connector 308 of the base assembly 102. With reference to FIGS. 4D and 4E, the fixed pin 428 includes a 180-degree groove or slot 430 and a 360-degree groove or slot 432. As described above, the fixed pin 428 functions together with the first switch mechanism 328 of the base assembly 102 to set the range of rotation about the first axis A1 for the oblique arm assembly 104.

With reference to FIG. 4E, the oblique arm upper connector 402 includes a powder sleeve 414 located within a powder sleeve hole 416, a second pair of pins 418, 419 each with a corresponding small pressure spring 420. The powder sleeve 414 has a surface 4000 and defines a pair of features 451, 453. The oblique arm upper connector 402 also includes a second knob 422, a second pressure cap 424, a second knob cover 426, and a pair of holes 450 extending through a surface 4100 of the upper connector 402 of the oblique arm assembly 406 into the powder sleeve hole 416. These components collectively form a second switch mechanism 436 that enables the degree of possible rotation of the power arm assembly 106 about the second axis A2 to be set to either a first number, e.g., 360-degrees, or a second number, e.g., 180-degrees. The second switch mechanism 436 also enables the power arm assembly 106 to be either locked in place to prevent separation or removal from the oblique arm assembly 104 or to be unlocked to allow separation or removal from the oblique arm assembly.

To these ends, in some embodiments, the components of the second switch mechanism 436 are arranged and aligned relative to each other so that when the second knob cover 426 is placed at a horizontal position (as shown in FIG. 4E), the biasing forces of the small pressure springs 420 maintain the second pair of pins 418, 419 in a retracted position relative to corresponding holes 450 associated with the oblique arm upper connector 402 and with corresponding features 451, 453 of the powder sleeve 414. In the retracted position, a fixed pin 514 (shown in FIG. 5A) of the power arm assembly 106 is unlocked from the oblique arm upper connector 402 and the power arm assembly may be vertically displaced (e.g., moved up or down) along the second axis A2 and decoupled from the oblique arm assembly 104.

When the second knob cover 426 is rotated to align an indicator 452 of the cover with a 360-degree mark 454 on the second pressure cap 424, a pin arc 456 of the second knob 422 engages the head or arc of the top pin 419 and advances the top pin through the top hole 450 of the oblique arm upper connector 402 and the top feature 451 of the powder sleeve 414. The shaft of the top pin 419 is thus placed into a 360-degree slot 518 (shown in FIG. 5A) of the fixed pin 514 of the power arm assembly 106. Accordingly, the power arm assembly 106 can rotate 360 degrees about the second axis A2. In this state of the second switch mechanism 436, the power arm assembly 106 cannot be removed from the oblique arm upper connector 402 because the end of the top pin 419 is within the 360-degree slot 518 and prevents vertical displacement (e.g., upward movement) of the power arm assembly 106 along the second axis A2.

When the second knob cover 426 is rotated to align the indicator 452 with a 180-degree mark 458 on the second pressure cap 424, the pin arc 456 of the second knob 422 engages the head or arc of the bottom pin 418 and advances the bottom pin through the bottom hole 450 of the oblique arm upper connector 402 and the bottom feature 453 of the powder sleeve 414. The shaft of the bottom pin 418 is thus placed into the 180-degree slot 516 (shown in FIG. 5A) of the fixed pin 514 of the power arm assembly 106. Accordingly, the power arm assembly 106 can rotate 180 degrees (±90 degrees) about the second axis A2. In this state of the second switch mechanism 436, the power arm assembly 106 cannot be removed from the oblique arm upper connector 402 because the end of the bottom pin 418 is within the 180-degree slot 516 and prevents vertical displacement (e.g., upward movement) of the power arm assembly 106 along the second axis A2.

Figure 5A:
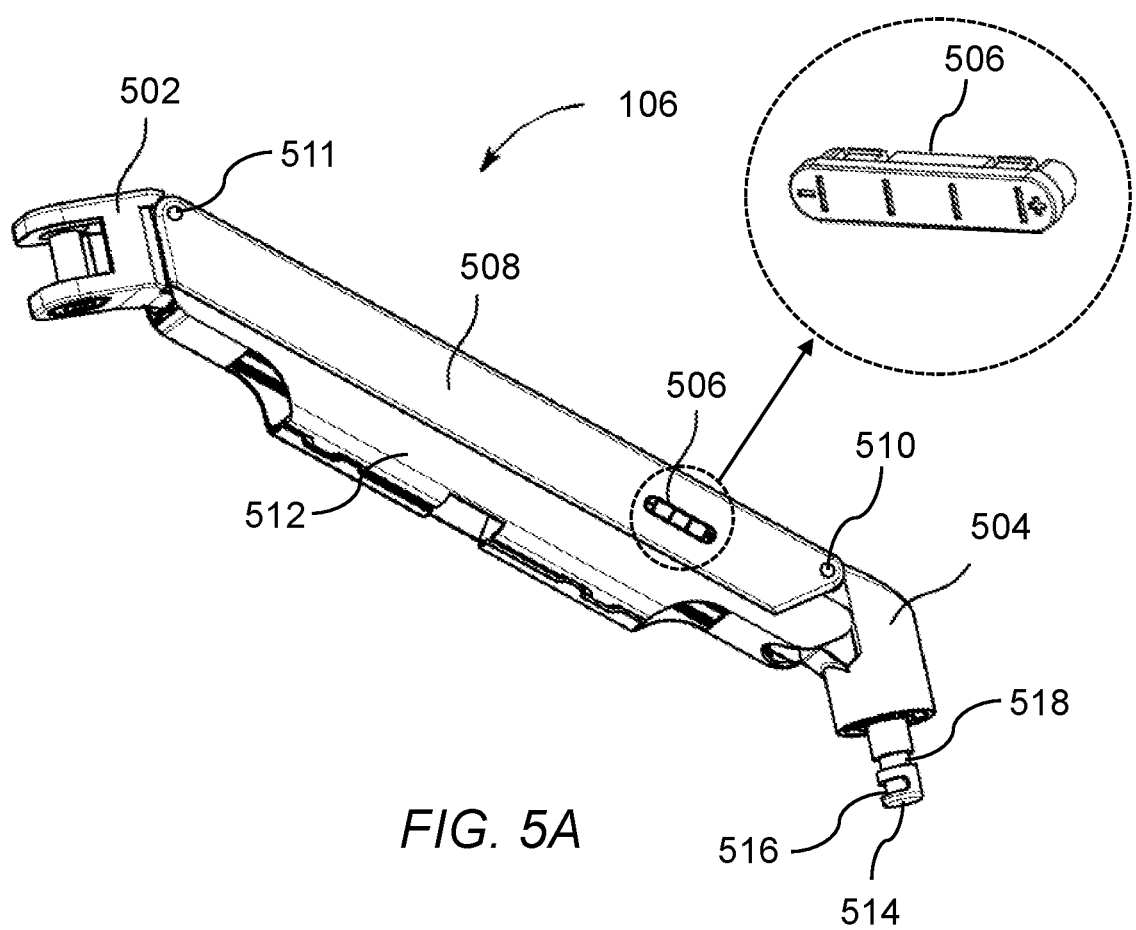
FIGS. 5A-5H are perspective view illustrations of the power arm assembly of the multifunctional apparatus of FIG. 1A and various component parts thereof, in accordance with one embodiment.
Figure 5B:
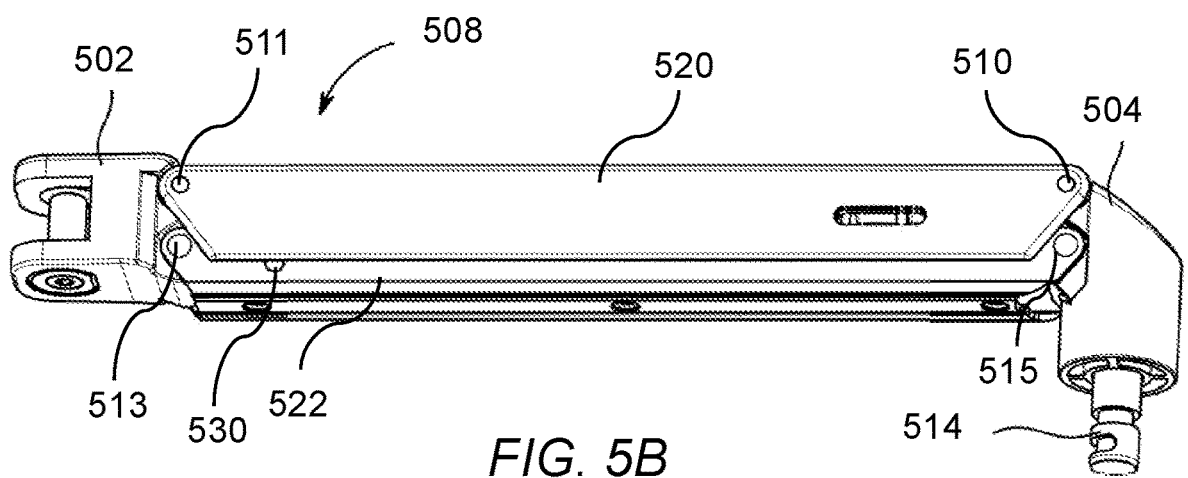

With reference to FIGS. 5A and 5B, in some embodiments the power arm assembly 106 of the apparatus of FIG. 1A includes an upper connector 502 and a lower connector 504 with a power arm 508 extending between the two connectors. As shown in FIG. 5A, a cable retainer 512 extends from the underneath side of the power arm 508 and is configured to receive electrical cables. The cable retainer 512 may be secured to the underside of the power arm 508 by interlaced snap slots and is removable.

The power arm lower connector 504 includes a fixed pin 514. The fixed pin 514 is configured to fit within and couple with the powder sleeve 414 included in the oblique arm upper connector 402 of the oblique arm assembly 104. The fixed pin 514 includes a 180-degree groove or slot 516 and a 360-degree groove or slot 518. As described above, the fixed pin 514 functions together with the second switch mechanism 436 of the oblique arm assembly 104 to set the range of rotation for the power arm assembly 106.

Figure 5C:
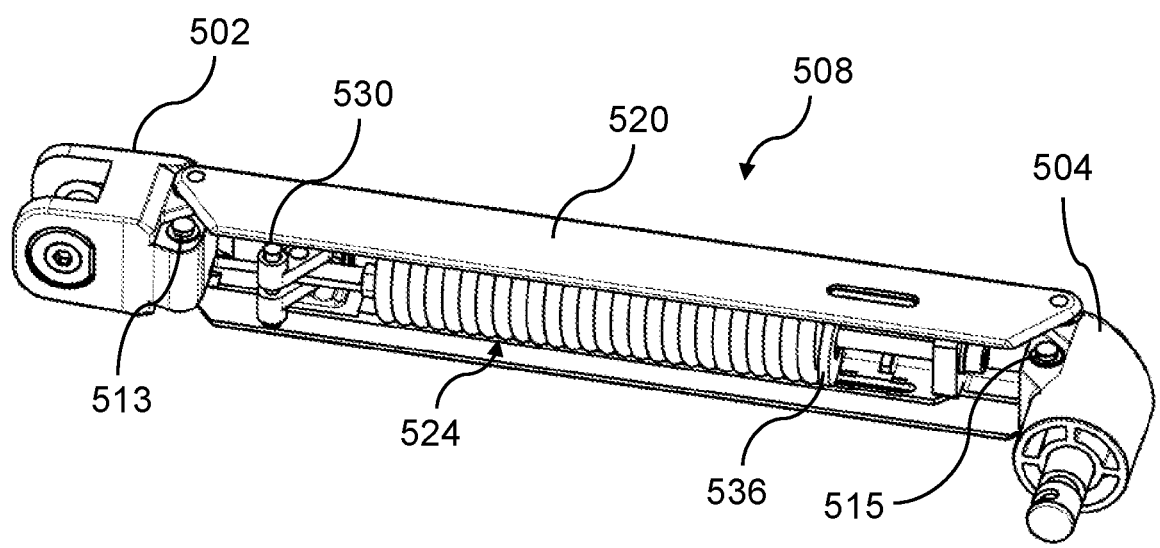
Figure 5D:
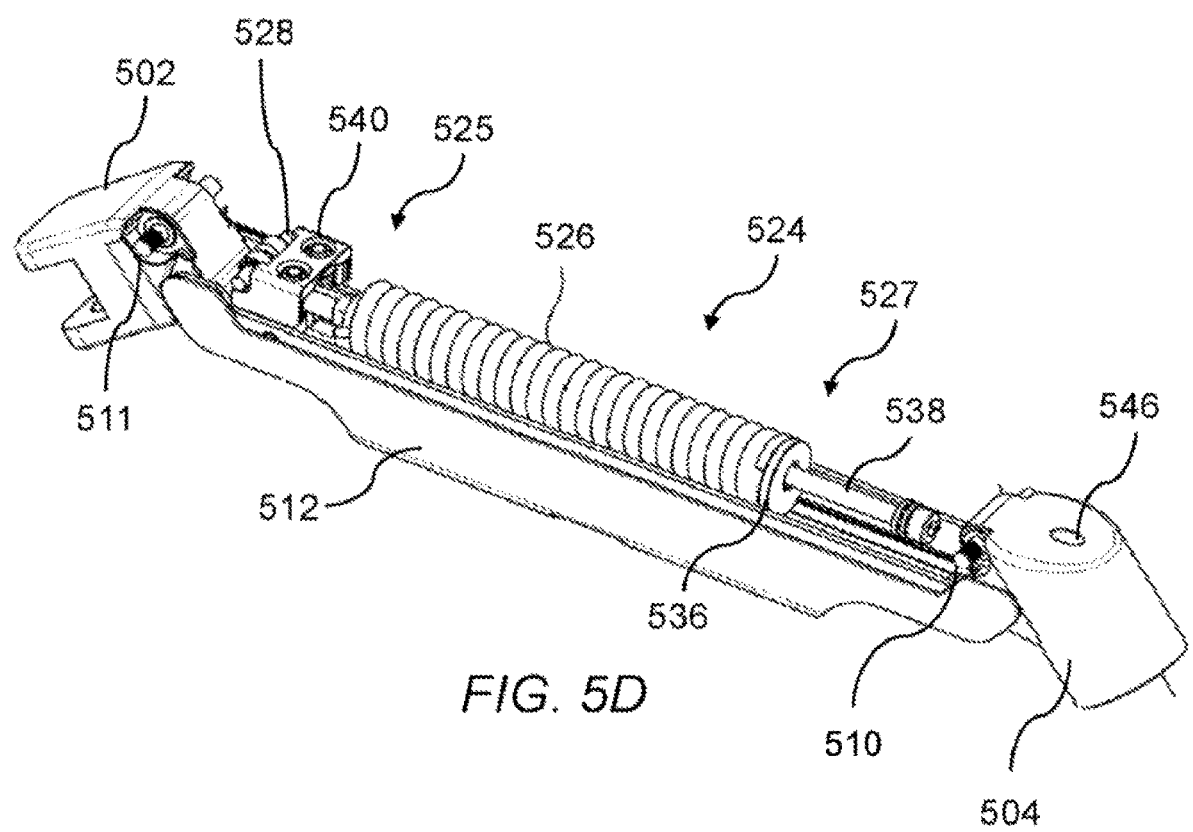

With additional reference to FIGS. 5B-5E, in some embodiments the power arm 508 includes an upper U-shaped structure 520 that fits over a lower U-shaped structure 522, and a spring assembly 524 positioned between the upper U-shaped structure and the lower U-shaped structure. Note that: in FIG. 5B the cable retainer 512 of FIG. 5A is removed, in FIG. 5C the lower U-shaped structure 522 of FIG. 5B is removed, in FIG. 5D the upper U-shaped structure 520 of FIG. 5A is removed, and in FIG. 5E the cable retainer 512 of FIG. 5D is removed.

The upper U-shaped structure 520 and the lower U-shaped structure 522 and the upper connector 502 and the power arm lower connector 504 are connected by four pins 510, 511, 513, 515. More specifically, the upper U-shaped structure 520 is coupled at one end to the upper connector 502 by pin 511 and at the opposite end to the power arm lower connector 504 by pin 510. The lower U-shaped structure 522 is coupled at one end to the upper connector 502 by pin 513 and at the opposite end to the power arm lower connector 504 by pin 515. The upper U-shaped structure 520 and the lower U-shaped structure 522 are not directly coupled to each other and accordingly are able to slide relative to each other. For example, note the change in positions of the upper U-shaped structure 520 and the lower U-shaped structure 522 in FIG. 2A and FIG. 2B.

Figure 5E:
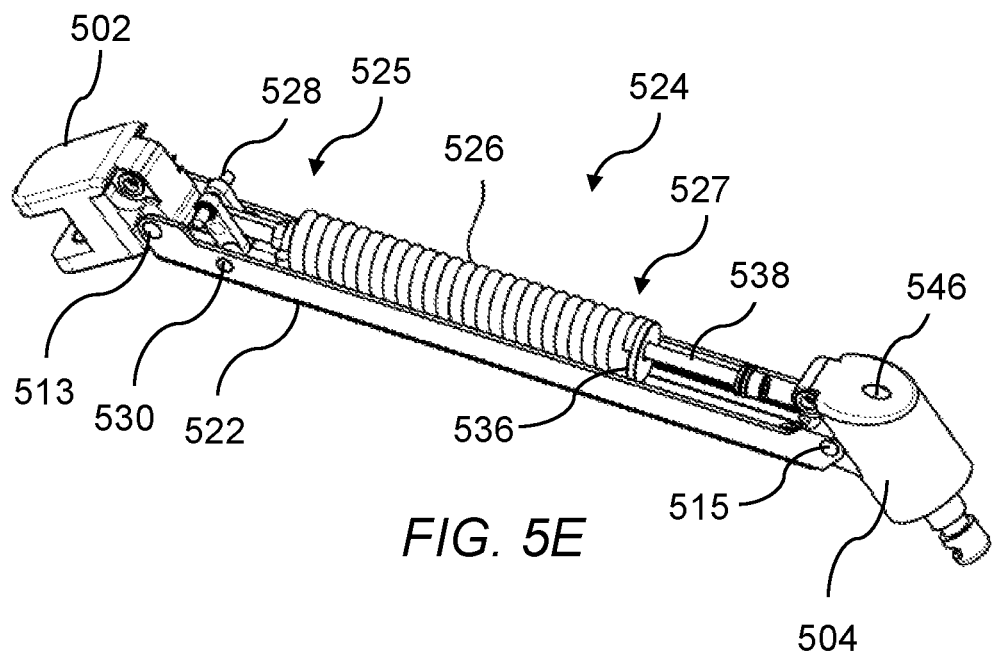
Figure 5F:
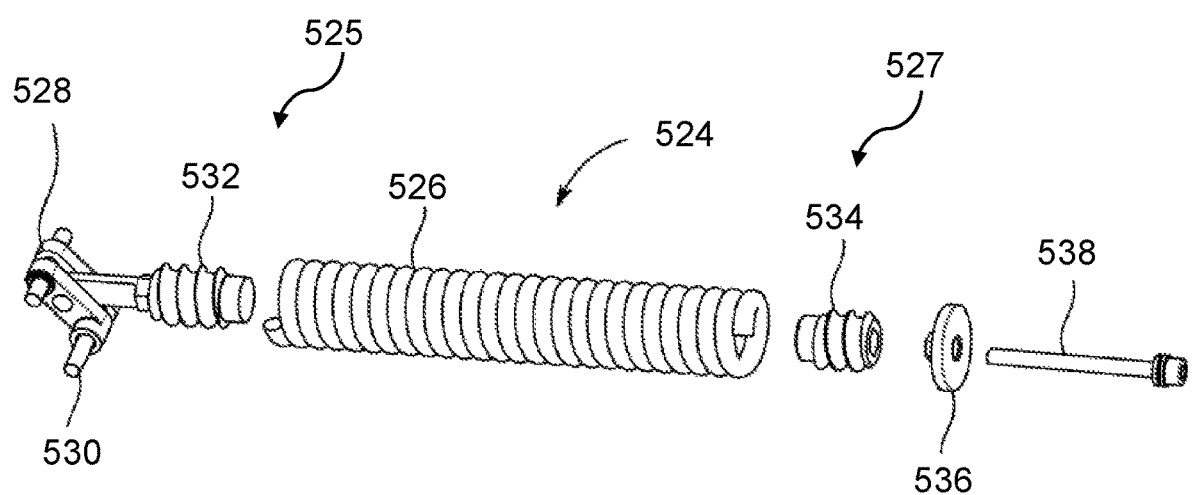

With continued reference to FIGS. 5D and 5E and with additional reference to FIG. 5F, the spring assembly 524 includes a drive spring 526, a spring assembly transfer unit 528, a first spring joint 532 at a first end 525, and a second spring joint 534 and an adjusting indicator ring 536 at a second end 527. The spring assembly 524 aids in supporting the weight of a computing device that is coupled to the board assembly 110. In one example configuration, the load-bearing range of the power arm assembly 106 is 6-16 LB.

With reference to FIGS. 5D through 5H, the first end 525 of the spring assembly 524 is mechanically coupled between the upper U-shaped structure 520 and the lower U-shaped structure 522 by a cover/pin-stop 540 associated with the upper U-shaped structure 520 and a pin 530 that extends through opposing walls of the lower U-shaped structure 522 and the spring assembly transfer unit 528. The second end 527 of the spring assembly 524 is mechanically coupled between the upper U-shaped structure 520 and the lower U-shaped structure 522 by an adjustment screw 538 that extends through a screw coupling 542 associated with the upper U-shaped structure 520 and engages with the second spring joint 534.

As shown in FIGS. 5C, 5D, and 5E, when the spring assembly 524 is assembled, the spring joints 532, 534 are positioned in the interior of the drive spring 526. The threaded arrangement of the spring joint 534 relative to the interior of the drive spring 526 is such that clockwise rotation of the spring joint results in a stretching and lengthening of the spring body along its axis, while counter clockwise rotation of the spring joint results in compression of the spring body along its axis.

Figure 5G:
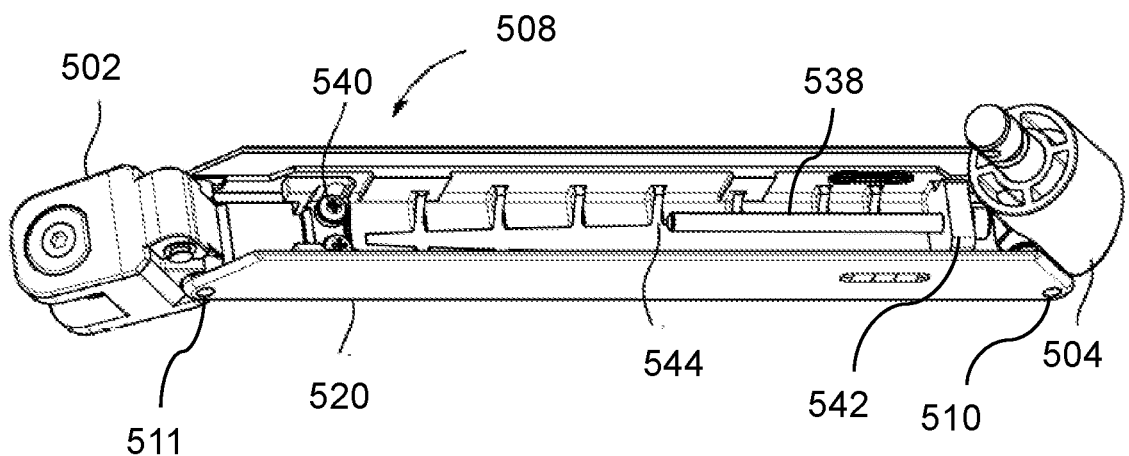
Figure 5H:
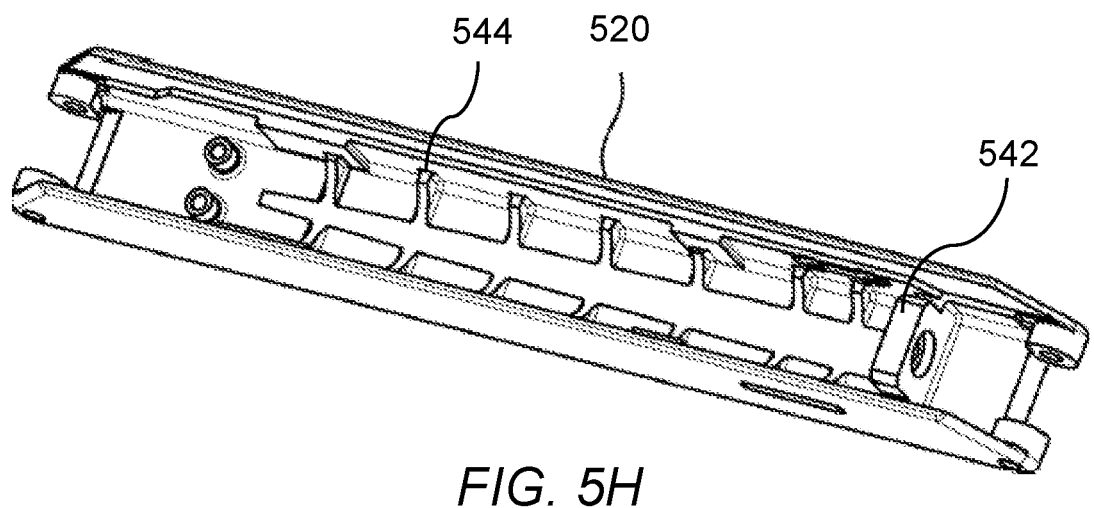
Figure 5I:
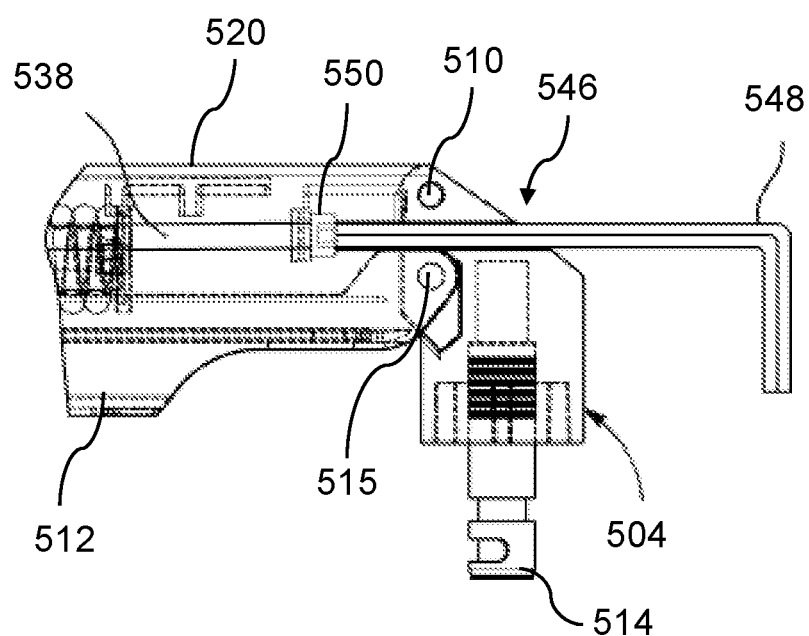
FIG. 5I is cross-section illustration of a portion of the power arm assembly of the multifunctional apparatus of FIG. 1A.

With reference to FIGS. 5B, 5D, and 5I, when the power arm assembly 106 is required to adjust the lifting weight, the power arm assembly is moved to the horizontal position to allow access to the spring assembly 524 by a hex wrench 548. The hex wrench 548 is inserted through an access port 546 of the power arm lower connector 504 and into the head 550 of the adjustment screw 538. To increase the force of the drive spring 526, the hex wrench 548 is turned clockwise. This translates to clockwise rotation of the adjustment screw 538 and the spring joint 534, which stretches or lengthens the drive spring 526 and increases the force value or strength of the drive spring. A user may want to do this when a new computing device is mounted to the board assembly 110, and the new computing device is heavier than the old computing device.

To decrease the force value or strength of the drive spring 526, the hex wrench 548 is turned counter clockwise. This translates to counter clockwise rotation of the adjustment screw 538 and the spring joint 534, which reduces the length of the drive spring 526 and decreases the force value or strength of the drive spring. A user may want to do this when a new computing device is mounted to the board assembly 110, and the new computing device is lighter than the old computing device.

With reference to FIGS. 5A and 5F, a spring force size display 506 provides an indication of the spring force to which the drive spring 526 is set. To this end, when the spring force is adjusted as just described, the adjusting indicator ring 536 at the second end 527 of the spring assembly 524 moves back and forth. This movement is visible through the spring force size display 506, with a change in position of the adjusting indicator ring 536 between the + sign and the − sign being indicative of an increase or decrease in force value.

With reference to FIGS. 5G and 5H, the upper U-shaped structure 520 includes several ribs 544 that increase the strength of the upper U-shaped structure 520.

With reference to FIGS. 6A-6D, in some embodiments the head assembly 108 of the apparatus of FIG. 1A includes a head 602 having a head insert slot 604 associated with a first side of the head and a connector seat 610 associated with a second side of the head. The head insert slot 604 is configured to couple with the board assembly 110 of the apparatus. The head assembly 108 also includes a connector 608 having a proximal coupling 606 and a distal coupling 612. The proximal coupling 606 includes a connector plug 628 configured to couple with the upper connector 502 of the power arm assembly 106. The distal coupling 612 is configured to couple to the connector seat 610.

Figure 6A:
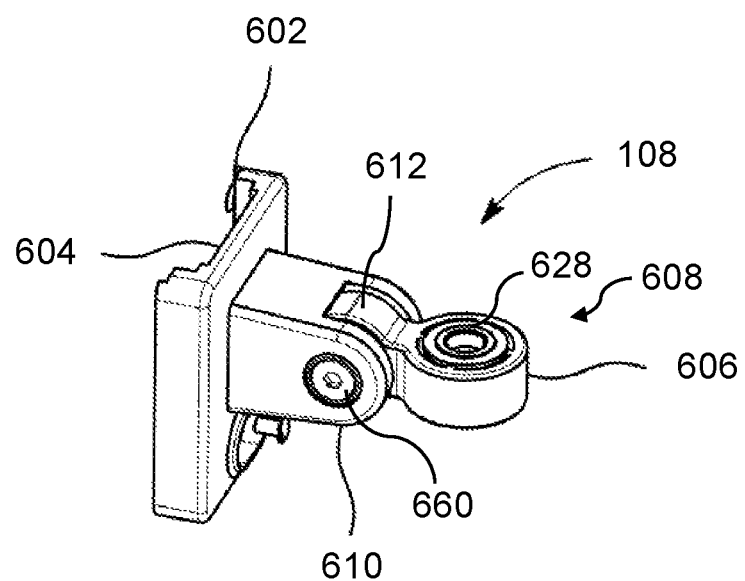
FIGS. 6A-6H are perspective view illustrations of the head assembly of the multifunctional apparatus of FIG. 1A and various component parts thereof, in accordance with one embodiment.
Figure 6B:
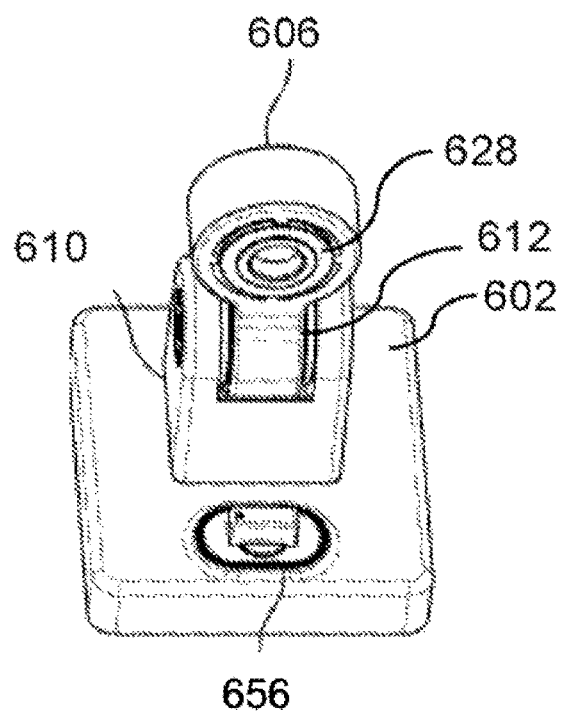
Figure 6C:
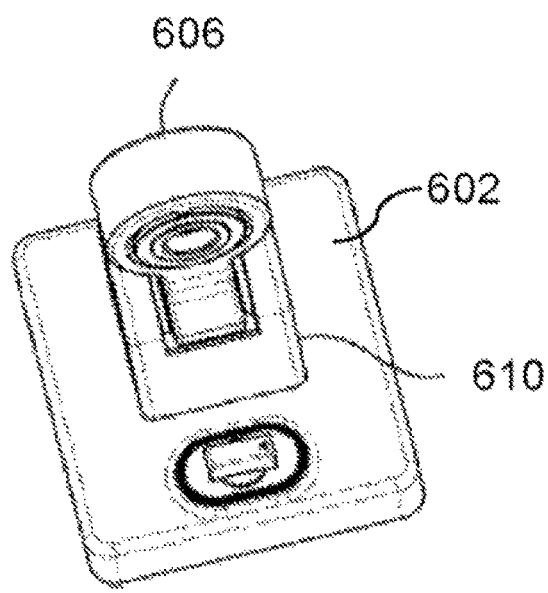
Figure 6D:
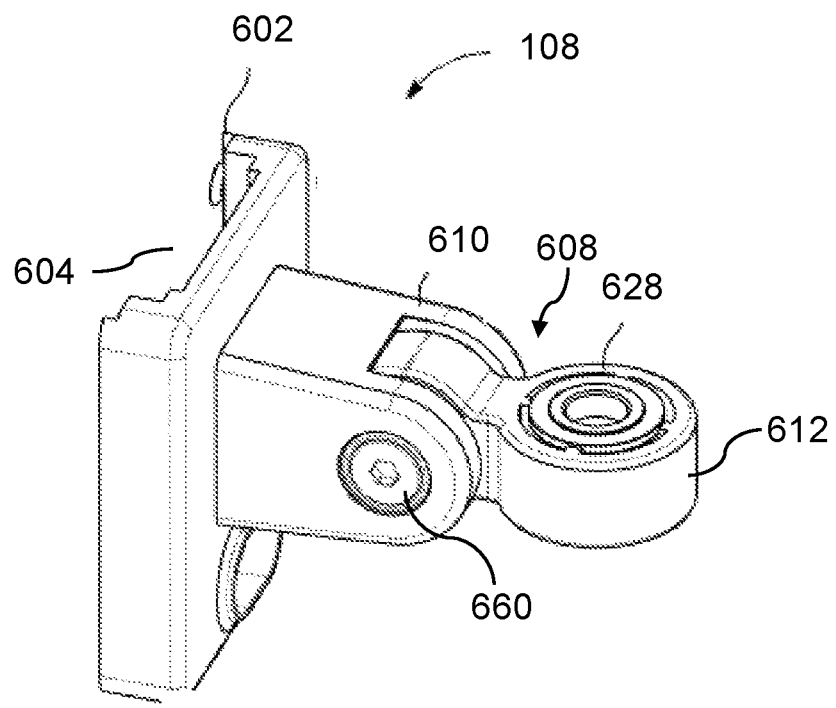
Figure 6E:
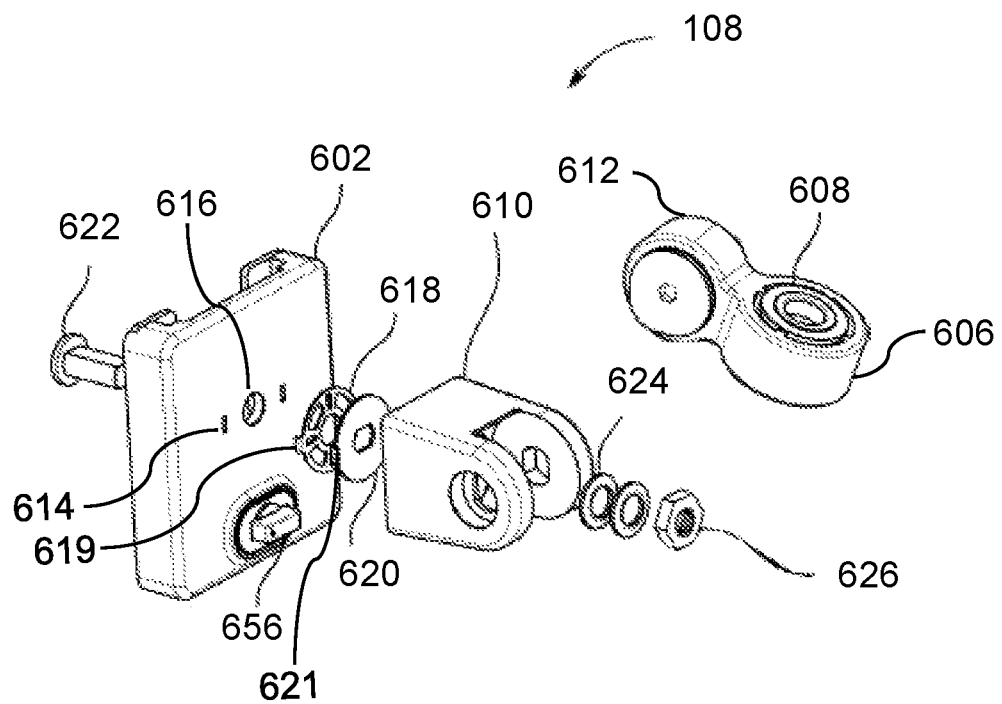

With reference to FIG. 6E, in some embodiments the connector seat 610 is secured to the head 602 using various hardware components. To this end, the head 602 may include a pair of pin holes 614 on either side of a head pin hole 616. A pair of friction plates 618, 620 are located between the head 602 and the connector seat 610. The head 602 and the connector seat 610 are secured together by a pin 622 that extends through the head pin hole 616 and couples with a washer 624 and a hexagon nut 626 at the opposing side of the connector seat.

Figure 6F:
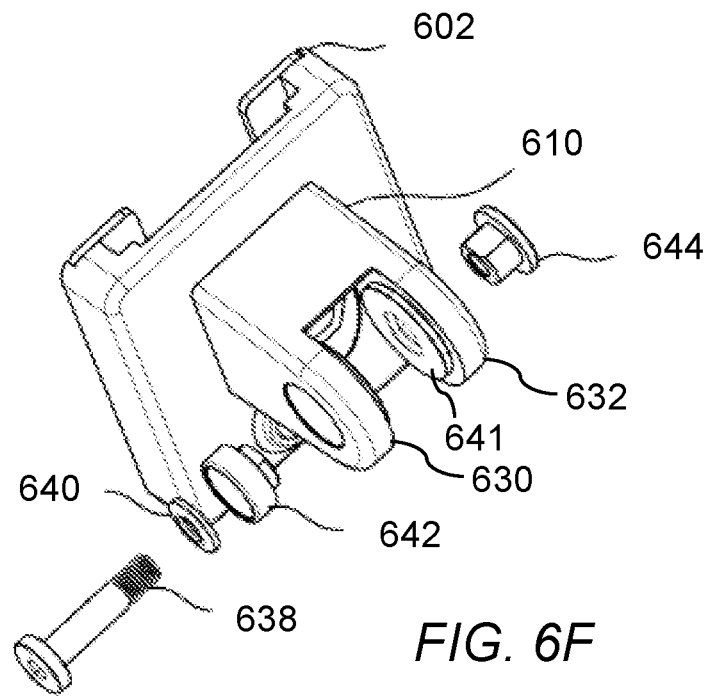
Figure 6G:
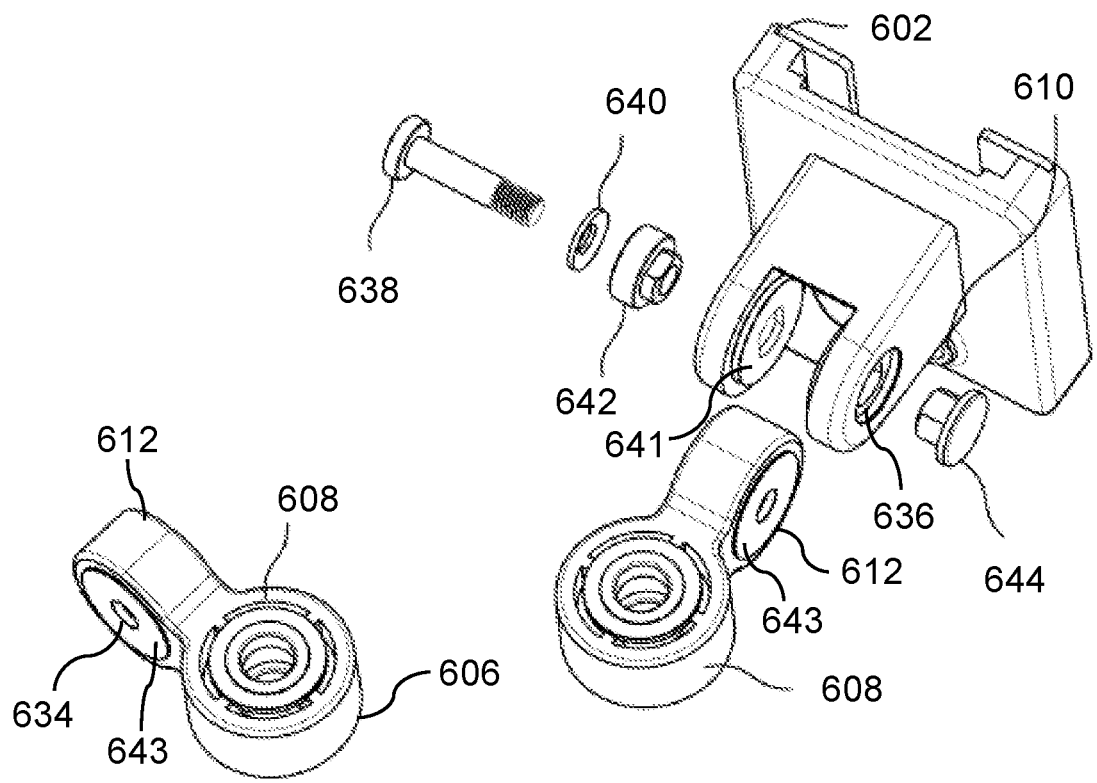

With reference to FIGS. 6F and 6G, in some embodiments the distal coupling 612 of the connector 608 couples to the connector seat 610 using various hardware components. To this end, the distal coupling 612 is located between opposing arms 630, 632 of the connector seat 610 such that a hole 634 through the distal coupling aligns with holes 636 through the opposing arms. The distal coupling 612 is secured in place with a screw 638 that extend through a washer 640, a head nut 642, the holes 636 of the opposing arms 630, 632, and couples with a screw head 644. The screw 638, together with the various hardware components, collectively define a pivot structure 660, which in turn defines a fourth axis A4 about which the head 602 and the connector seat 610 at least partially rotated.

With reference to FIG. 1A, in some embodiments, the head assembly 108 is configured so that the head 602 and the connector seat 610 rotates about the fourth axis A4 to tilt up to about 70-degrees upward and up to about 50-degrees downward. With reference to FIG. 1C, the head assembly 108 is configured so that the head 602, the connector seat 610, and the connector 608 rotate about the third axis A3. In some embodiment, the range of rotation is 180-degrees total, with 90-degrees to both the left side and the right side.

Figure 6H:
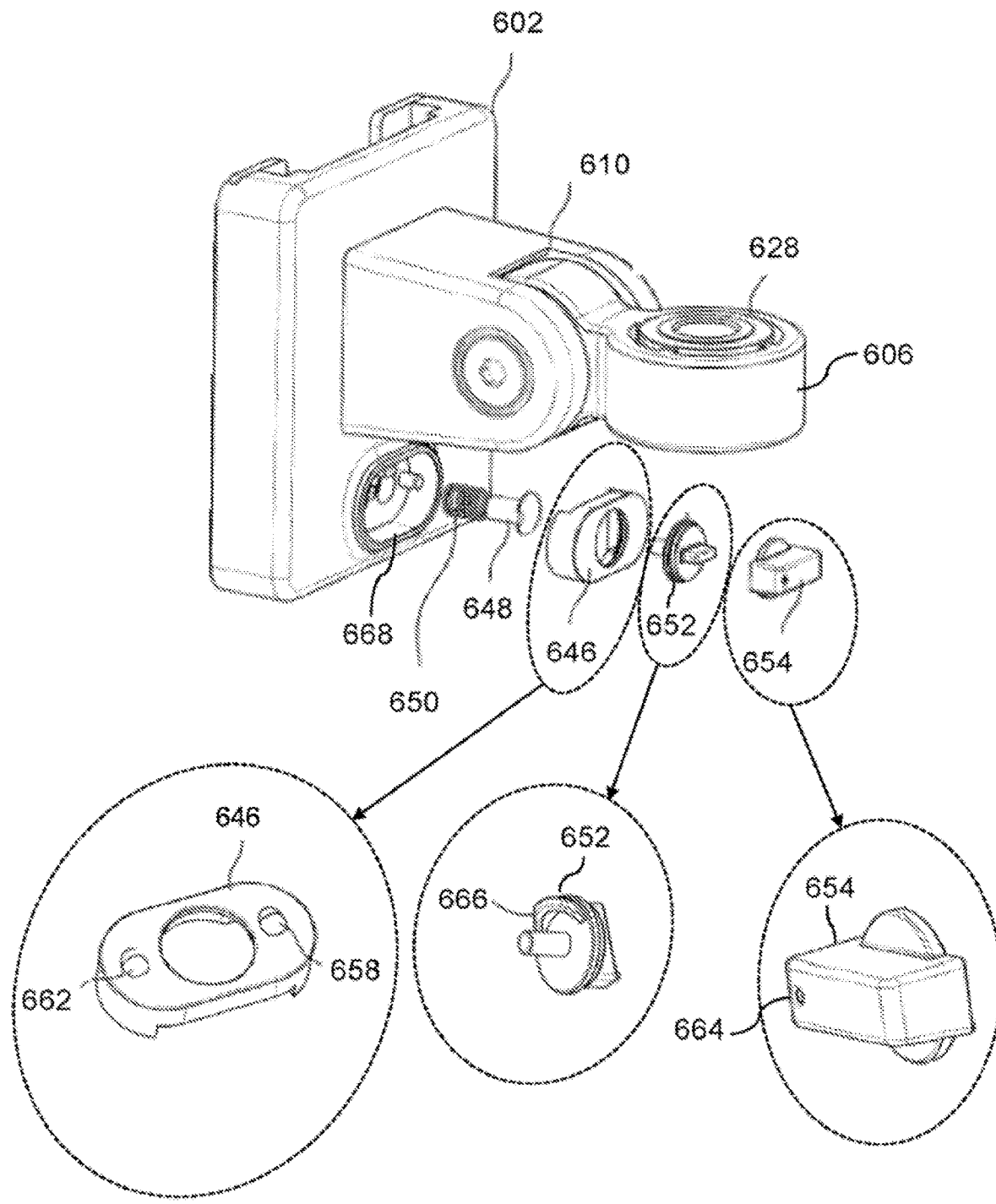

With reference to FIG. 6H, in some embodiments the head 602 of the head assembly 108 includes a pressure cover 646, a pin 648, a small pressure spring 650, a knob 652, and a knob sleeve 654. These components align and are mechanically assembled to fit within a plug recess 668 in the head 602, and collectively form a lock button 656 shown in FIG. 6E. As described further below with reference to FIG. 8, the lock button 656 is configured to secure the board assembly 110 to the head 602 and to enable removal of the board assembly 110 from the head 602.

Figure 7A:
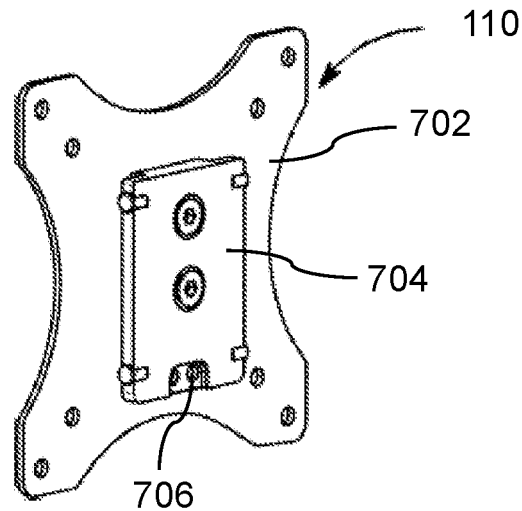
FIGS. 7A and 7B are perspective view illustrations of the board assembly of the multifunctional apparatus of FIG. 1A, in accordance with one embodiment.
Figure 7B:
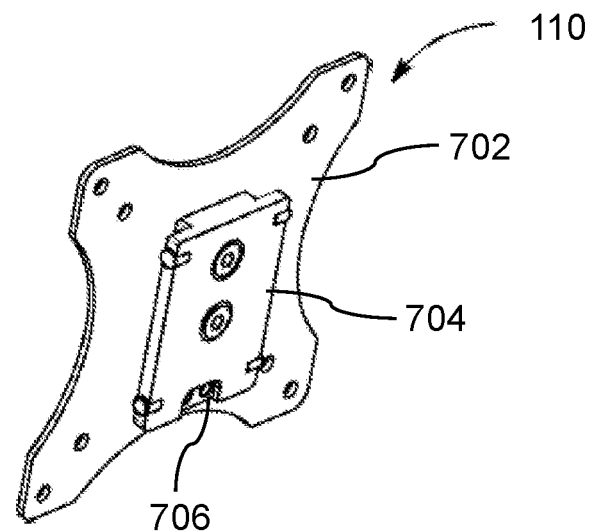

With reference to FIGS. 7A and 7B, in some embodiments the board assembly 110 of the apparatus 100 of FIG. 1A includes a board 702 (commercialized as VESA® board), and a head insert 704. The head insert 704 is configured to slide into the head insert slot 604 of the head assembly 108. The head insert 704 includes a pair of holes 706 positioned to align with corresponding holes in the head 602 and the pin 648 of the head assembly 108.

With reference to FIG. 1B, in an embodiment, the board assembly 110 rotates at least 90 degrees. This may be done, for example, to change the orientation of a monitor between portrait and landscape orientations.

Figure 8:
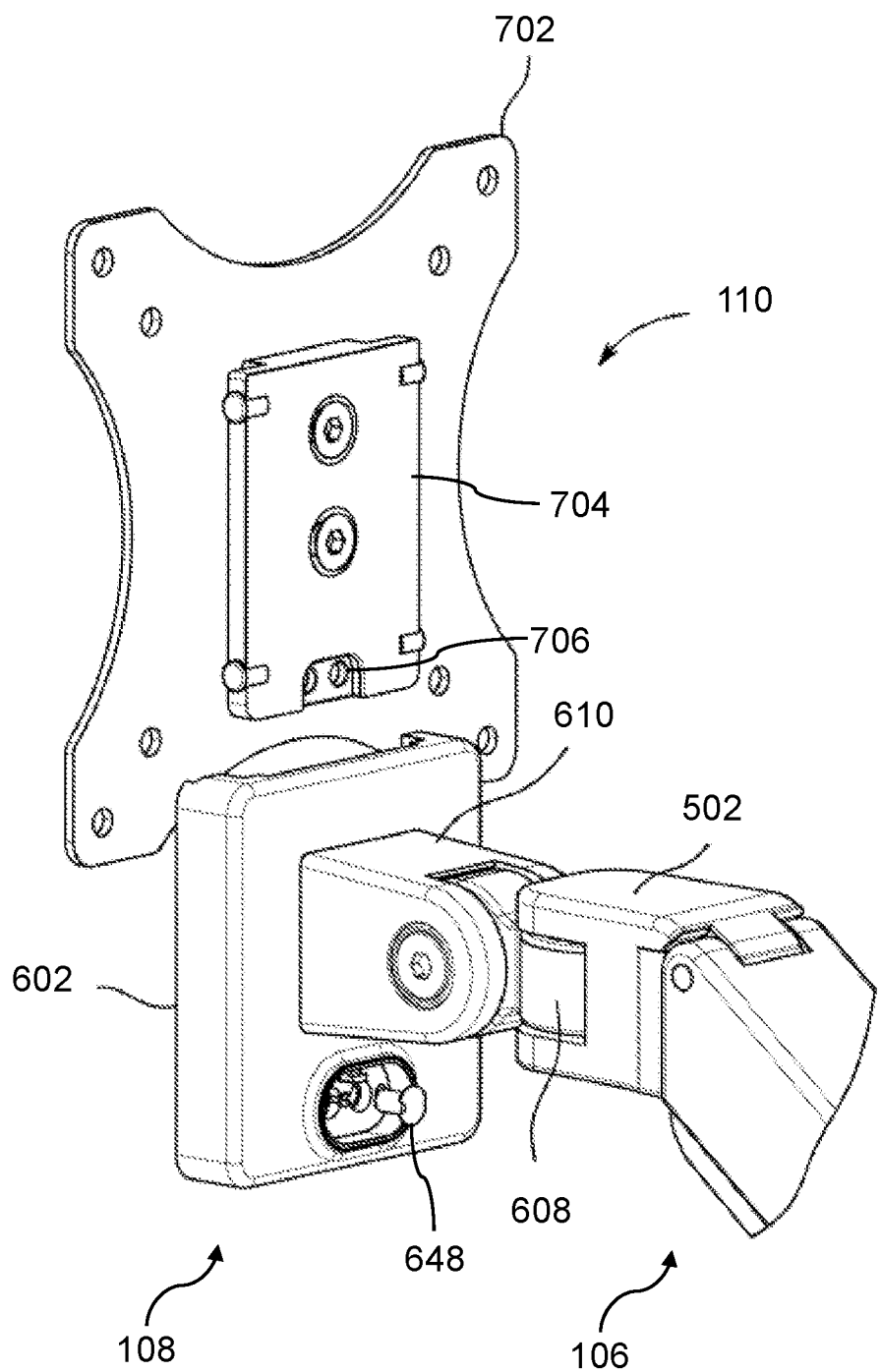
FIG. 8 is a perspective view illustration of the coupling of the oblique arm assembly with the base assembly, and the base assembly with the board assembly, in accordance with one embodiment.

With reference to FIGS. 6H and 8, as mentioned above, the lock button 656 is configured to secure the board assembly 110 to the head 602 and to enable removal of the board assembly 110 from the head 602. To this end, rotation of the knob sleeve 654 between a locked position 658 and an unlocked position 662, as identified on the pressure cover 646, translates to a corresponding rotation of the knob 652. The knob 652 includes an arcuate projection or pin arc 666 that engages (e.g., abuts with) the head or pin arc of the pin 648. Rotation of the knob 652 to the locked position 658 causes the pin arc 666 to engage and push against the head of the pin 648. The force of the pin arc 666 overcomes the biasing force of the small pressure spring 650 and advances the shaft of the pin 648 into a hole in the board assembly 110 to thereby lock the board assembly into the head 602.

Rotation of the knob 652 to the unlocked position 662 causes the pin arc 666 to disengage the head of the pin 648. This, together with the biasing force of the small pressure spring 650, causes the shaft of the pin 648 to retract from the hole in the board assembly 110 to thereby unlock the board assembly from the head 602 and allow for its removal from the head. An indicator 664 on the knob sleeve 654 indicates the position of the knob 652 with respect to the locked position 658 and the unlocked position 662 on the pressure cover 646.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily include that feature, structure, characteristic, property, element, or limitation. Further, repeated use of the phrase "in an embodiment" does not necessarily refer to the same embodiment.

The various aspects of this disclosure are provided to enable one of ordinary skill in the art to practice the present disclosed apparatus. Various modifications to exemplary embodiments presented throughout this disclosure will be readily apparent to those skilled in the art. Thus, the claims are not intended to be limited to the various aspects of this disclosure but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for."

The invention claimed is:

1. An apparatus for securing a computing device relative to a platform, the apparatus comprising:
   a base assembly configured to secure to the platform, the base assembly having a base connector that defines a first axis of the apparatus relative to the platform;
   an oblique arm assembly having a lower connector and an upper connector, wherein the lower connector of the oblique arm assembly is coupled to the base connector of the base assembly along the first axis and configured to rotate at least partially about the first axis, and the upper connector of the oblique arm assembly defines a second axis of the apparatus generally parallel with the first axis;
   a power arm assembly having a lower connector and an upper connector, wherein the lower connector of the power arm assembly is coupled to the upper connector of the oblique arm assembly along the second axis and configured to rotate at least partially about the second axis, the upper connector of the power arm assembly defines a third axis of the apparatus generally parallel with the second axis, and the lower connector of the power arm assembly includes a first fixed pin;
   a head assembly having a head and a connector, wherein the connector of the head assembly is coupled to the upper connector of the power arm assembly along the third axis and configured to rotate at least partially about the third axis; and
   a board assembly coupled to the head of the head assembly and configured to secure to the computing device;
   wherein the upper connector of the oblique arm assembly comprises a first switch mechanism configured to enable the power arm assembly to be unlocked relative to the oblique arm assembly, to be rotatably engaged with the oblique arm assembly to be rotatable a first degree relative to the oblique arm assembly, or to be rotatably engaged with the oblique arm assembly to be rotatable a second degree relative to the oblique arm assembly;
   the first switch mechanism includes a powder sleeve hole within the upper connector of the oblique arm assembly, a powder sleeve located within the powder sleeve hole, a pair of pins, a pair of pressure springs, a pair of holes extending through a surface of the upper connector of the oblique arm assembly, a pair of features defined by the powder sleeve, a knob, a knob cover having an indicator, and a pressure cap having a first-degree mark and a second-degree mark, wherein the pair of pins is configured to extend through the pair of pressure springs, the pair of holes, and the pair of features;
   the first fixed pin includes a first-degree groove and a second-degree groove, wherein the first fixed pin is configured to fit within and couple with the powder sleeve, and wherein the first fixed pin functions together with the first switch mechanism to set a range of rotation of the power arm assembly relative to the oblique arm assembly along the second axis;
   wherein when the knob cover is placed at a first location, biasing forces of the pair of pressure springs maintain the pair of pins in a retracted position relative to the pair of holes and the pair of features, wherein when the pair of pins is in the retracted position, the first fixed pin is unlocked from the upper connector of the oblique arm assembly such that the power arm assembly is configured to be vertically displaceable along the second axis to be decoupled from the oblique arm assembly;
   when the knob cover is rotated to align the indicator with the first-degree mark of the pressure cap, a pin arc of the knob engages a head of a first pin of the pair of pins and advances the first pin through a first hole of the pair of holes and through a first feature of the pair of features, such that a shaft of the first pin is placed in the first-degree groove of the first fixed pin, causing the first fixed pin to become rotatably engaged with the upper connector of the oblique arm assembly so that the power arm assembly is configured to rotate a first degree about the second axis and the power arm assembly is not vertically displaceable along the second axis; and
   when the knob cover is rotated to align the indicator with the second-degree mark of the pressure cap, the pin arc of the knob engages a head of a second pin of the pair of pins and advances the second pin through a second hole of the pair of holes and through a second feature of the pair of features, such that a shaft of the second pin is placed in the second-degree groove of the first fixed pin, causing the first fixed pin to become rotatably engaged with the upper connector of the oblique arm assembly so that the power arm assembly is configured to rotate a second degree about the second axis, and the power arm assembly is not vertically displaceable along the second axis.

2. The apparatus of claim 1, wherein:
   the lower connector of the oblique arm assembly comprises a second fixed pin having a first slot that extends a first number of degrees around a shaft of the second fixed pin and a second slot that extends a second number of degrees around the shaft of the second fixed pin; and
   the base connector of the base assembly comprises
   a second switch mechanism configured to receive the second fixed pin and to engage either the first slot or the second slot of the second fixed pin to thereby set a range of rotation of the oblique arm assembly relative to the base assembly corresponding to either the first number of degrees or the second number of degrees.

3. The apparatus of claim 2, wherein the range of rotation of the oblique arm assembly relative to the base assembly is one of 360 degrees or 180 degrees.

4. The apparatus of claim 2, wherein the second switch mechanism is further configured to engage either the first slot or the second slot of the second fixed pin to thereby prevent a vertical displacement of the oblique arm assembly relative to the base assembly along the first axis.

5. The apparatus of claim 2, wherein the second switch mechanism is further configured to engage neither the first slot nor the second slot of the second fixed pin to thereby allow a vertical displacement of the oblique arm assembly relative to the base assembly along the first axis.

6. The apparatus of claim 1, wherein the first degree which the power arm assembly is configured to rotate about the second axis is one of 360 degrees or 180 degrees.

7. The apparatus of claim 1,
   wherein the power arm assembly further comprises:
   a spring assembly extending between the lower and upper connectors of the power arm assembly, the spring assembly having a longitudinal axis extending between the lower and upper connectors of the power arm assembly;

a rotation pin located at the lower connector of the power arm assembly and defining a fourth axis of the apparatus that is generally orthogonal to the second axis of the apparatus and the longitudinal axis of the spring assembly;

wherein the power arm assembly is configured to rotate about the fourth axis between an upper position and a lower position, and the spring assembly is configured to exert a force to the power arm assembly during rotation.

8. The apparatus of claim 7, wherein the head assembly further comprises:

a pivot structure between the head of the head assembly and the connector of the head assembly, the pivot structure of the head assembly defining a fifth axis of the apparatus that is generally orthogonal to the third axis, and the head of the head assembly is configured to rotate about the fifth axis.

9. The apparatus of claim 8, wherein the head of the head assembly is configured to tilt either upward or downward from a horizontal position relative to the fifth axis.

10. The apparatus of claim 1, wherein the head assembly comprises a lock mechanism configured to engage a hole of the board assembly and to transition between a locked position wherein the board assembly is secured to the head of the head assembly, and an unlocked position wherein the board assembly is configured to be removable from the head of the head assembly.

11. The apparatus of claim 1, wherein the power arm assembly further comprises a spring assembly, an upper U-shaped structure and a lower U-shaped structure;

the spring assembly includes a first end, a second end, and a drive spring coupled between the first end and the second end, wherein the first end comprises a spring assembly transfer unit and a first spring joint, and the second end comprises a second spring joint and an adjusting indicator ring;

wherein the first end is mechanically coupled between the upper U-shaped structure and the lower U-shaped structure by a cover and a securing pin, wherein the cover is associated with the upper U-shaped structure, and wherein the securing pin extends through opposing walls of the lower U-shaped structure and the spring assembly transfer unit;

the second end of the spring assembly is mechanically coupled between the upper U-shaped structure and the lower U-shaped structure by an adjustment screw that extends through a screw coupling associated with the upper U-shaped structure and engages with the second spring joint;

when the spring assembly is assembled, the first and second spring joints are threaded in an interior of the drive spring, and a threaded arrangement of the second spring joint relative to the interior of the drive spring is configured such that a clockwise rotation of the second spring joint in a first direction results in a stretching and lengthening of a body of the drive spring along a longitudinal axis of the drive spring and increasing a force value of the drive spring, while a counterclockwise rotation of the second spring joint results in compression of the body of the drive spring along the longitudinal axis of the drive spring.

\* \* \* \* \*